United States Patent Office 3,539,545
Patented Nov. 10, 1970

3,539,545
SYNTHETIC PROTECTIVE FILM FOR USE IN PLANT CULTIVATION AND METHOD OF MAKING THE SAME
Kiko Tanisawa, Yamanashi-ken, Japan, assignor to Mitsubishi Monsanto Chemical Company, Tokyo, Japan, a corporation of Japan
No Drawing. Continuation-in-part of application Ser. No. 360,095, Apr. 15, 1964. This application Dec. 8, 1967, Ser. No. 688,957
Int. Cl. C08f 3/30, 45/58
U.S. Cl. 260—92.8
6 Claims

ABSTRACT OF THE DISCLOSURE

Synthetic resin film or sheet material suitable for use in plant protection and cultivation consists essentially of polyvinyl chloride (PVC) intimately combined, by the aid of a specific treating method, with tannic acid, to result in a new product referred to as tannic PVC having new physical characteristics in the form of low thermal conductivity, low infrared transmission and a transmission range within the lower part of the infrared spectrum, whereby to substantially improve its qualities as a plant protecting material by ensuring high heat insulation and an inside temperature always in excess of the outside or atmospheric temperature. The material being treated in a solution of tannic acid at increased temperature and cooled and dried subsequently may be either in the form of the final PVC film or sheet material, or in the initial or powder form of the PVC, to be subsequently converted into sheet or film form.

---

This application is a continuation-in-part of application Ser. No. 360,095, filed Apr. 15, 1964.

The present invention relates to synthetic resin film or sheet material suitable for the protection and growth promotion of plants, fruits and the like horticultural and agricultural products.

It has already been proposed to employ material in sheet or film form, such as paper, cellophane (regenerated cellulose) and other film-forming synthetic materials for the protection and promotion of the growth of plants and the like agricultural products. The known materials have, however, been found unsatisfactory from both a practical and economic point of view, in that the results obtained have been rather limited or inadequate, both in ensuring the necessary protection from outside or atmospheric temperature fluctuations, on the one hand, and in speeding up or promoting cultivation or plant growth, on the other hand.

The reasons for the limited success obtained with conventional film-forming synthetic materials, used either directly as a covering for the plants or other products to be protected, or in conjunction with hotbed or hothouse cultivation, to replace the use of glass, will become more apparent from the basic concepts and considerations concerning the requirements for an effective and successful film-forming synthetic protective product as derived or resulting from the extensive studies made and research conducted by applicant.

In the first place, in order to provide adequate protection from relatively fast and/or wide atmospheric or surrounding temperature changes or fluctuating cycles, the protecting material must have a relatively low thermal conductivity as well as a low transmission factor for heat or infrared rays, to reduce heat losses of the soil being protected as a result of both direct dissipation or conduction, on the one hand, as well as by radiation through the protective material or covering, on the other hand. In other words, the protective film or sheet should act as an efficient heat insulator, to ensure a minimum of heat loss during periods of low surrounding temperature, such as during nights and in cold seasons. Besides, the low thermal conductivity and low transmission factor for infrared radiation results in the film or covering acting as a thermal buffer or equalizing means by preventing abnormal rise and fall of the inside or soil temperature during changing hot and cold weather conditions or cycles, respectively, excessive and/or sudden changes of soil temperature being liable to exert a deleterious, if not destructive, effect on the plants or other agricultural or horticultural products to be protected.

In other words, the low infrared transmission through the material results in the radiation being absorbed by the film or covering, whereby to prevent excessive rise and fall of the soil temperature concomitant with outside or atmospheric temperature fluctuations, on the one hand, while minimizing heat losses or excessive radiation from the soil, as a result of the relatively low thermal conductivity and heat transmission of the material, on the other hand.

A third requirement for a practical synthetic film material for use in plant protection and cultivation is to make sure that the inside temperature always remains above the outside or atmospheric temperature, substantially independently of the range of atmospheric temperature fluctuations or heating and cooling cycles. This requirement is fulfilled practically, in accordance with the concept underlying the present invention, by a material whose major or peak transmission is restricted to the short wave length part of the infrared spectrum, that is, practically to the range of wavelengths from $6\mu$–$10\mu$, assuming the total infrared spectrum to encompass a range of $6\mu$–$14\mu$ ($\mu = 10^{-6}$ m.).

The foregoing requirement is based on the well-known phenomenon or fact relative to the radiation by a black body, that is, in the present case by the soil to be treated, that the maximum or peak radiation is shifted from the shorter towards the longer wavelength portion of the spectrum in proportion as the temperature of the body (soil) is decreased. As an example, at 100° C. the maximum or peak infrared radiation is found to be at about $8\mu$ of the spectrum, this maximum being shifted to about $10\mu$ at a temperature of 15° C. and to still lower values in proportion to a continued temperature reduction. As a consequence of this phenomenon, it has been found, in the case of conventional film-forming synthetic materials, that a condition may arise in the case of relatively low atmospheric temperatures, such as during nights and cold seasons, where the inside temperature actually decreases below the outside or atmospheric temperature as a result of the afore-mentioned shift of the maximum radiation by the soil towards the longer wavelengths of the infrared spectrum. In a not unusual example of an outside temperature of say 10° C., it has been observed that the inside temperature had actually fallen to zero or freezing point, whereby to defeat the very purpose of the film as a protective and cultivation promoting means.

In his search for a suitable film-forming synthetic material of the referred to type for use in plant protection and cultivation, applicant has found none of the conventional and commercially available synthetic materials, such as cellophane, polyethylene and polyvinyl chloride, to possess the properties outlined to a sufficient degree as to be able to serve as a satisfactory product for plant protection. Even the most satisfactory material polyvinyl chloride, hereinafter referred to as PVC for the purpose of this specification, while possessing some of the desirable characteristics for plant protection, fails to produce satisfactory results from both a practical as well as economical standpoint or requirement. More specifically, while having a somewhat lower thermal conductivity and infrared transmission compared with the other materials, raw PVC is deficient in providing the required peak transmission within the shorter range wavelength range of the infrared spectrum, to ensure a higher inside temperature in case of relatively low outside temperatures, in the manner explained and pointed out hereinabove.

Accordingly, an important object of the present invention is the provision of an improved synthetic film-forming material, and a method of making the same, which is substantially devoid of the foregoing and related defects and difficulties inherent in the conventional synthetic materials heretofore proposed for use in plant protection and cultivation.

A more specific object of the invention is the provision of a composite film-forming material of the referred to type, and a method of making the same, which has both a relatively low thermal conductivity and transmission of infrared or heat rays, and which exhibits a maximum or peak transmission within the shorter wave length range of the infrared spectrum.

Still another object of the invention is the provision of a synthetic film-forming material for use as a protective film or sheet in plant protection and cultivation, which material acts as an efficient heat insulator for the soil to be protected, on the one hand, and which substantially prevents or blocks heat radiation from the soil during periods of relatively low outside or atmospheric temperature.

The shortcomings and difficulties inherent in the known synthetic film-forming materials are substantially overcome by the improved compound or composite material developed by applicant, comprising PVC serving as basic or raw material and conditioned by or reacted with tannic acid, in the manner described in greater detail hereafter, to result in a new improved product herein referred to as "tannic PVC" for the purpose of this specification. Tannic PVC in film or sheet form according to the invention possesses, substantially or to a sufficient degree, the desirable properties and characteristics of a practically and economically satisfactory material for use in plant protection and cultivation, as evidenced by numerous practical tests and experiments conducted by applicant.

In the first place, tannic PVC film or sheet produced in accordance with the invention has both a thermal conductivity and infrared transmission substantially below the respective values of the parent material or raw PVC, whereby to act as an efficient heat insulator in the manner pointed out and understood from the foregoing. Besides, the infrared transmission characteristic of the tannic PVC differs from the parent material by a shift of its peak or maximum towards the shorter wave length region of the spectrum to a sufficient extent, whereby to prevent excessive heat loss or radiation at the lower soil temperatures and to ensure an inside temperature always being in excess of the outside or atmospheric temperature. This applies to arrangements or applications both where the tannic PVC is used in the form of a flexible film covering the plants to be protected, as well as to hotbed or the like applications using tannic PVC sheet as heat or insulating material.

According to one method of producing tannic PVC film or sheet, the finished PVC film manufactured in a conventional manner is treated with an alcoholic or aqueous solution of tannic acid, either solely or mixed with phenol, at elevated temperature, and then cooled and dried to provide a final product for use in plant protection and cultivation.

According to an alternative method of producing tannic PVC film or sheet, commercial PVC powder is treated or intimately combined with an alcoholic or aqueous solution of tannic acid, or a mixture thereof with phenol, and the thus obtained product subsequently formed into a film or sheet product by conventional means or manufacturing processes.

The following are a few illustrative examples of producing tannic PVC sheet or film according to the invention which have been found to produce a product ensuring satisfactory results in practice.

EXAMPLE 1

Commercial PVC film is dipped in an aqueous solution containing 3% based on the weight of the film of tannic acid at a bath ratio of 1:40. The temperature of the solution is kept at 80°–90° C. and the treating or reaction time maintained during 30–60 minutes. The treated film is then removed from the bath and cooled, to obtain a product in film or sheet form suitable for plant protection and cultivation in accordance with the invention.

EXAMPLE 2

Commercial PVC film or sheet is dipped in an aqueous solution containing 4% based on the weight of the film of tannic acid and 0.5% of phenol and treated as in Example 1, to obtain a product for use in accordance with the invention.

EXAMPLE 3

Commercial PVC powder is dipped in an aqueous solution containing 1% based on the weight of the powder of tannic acid at a bath ratio of 1:15. The temperature of the bath is maintained at 80–90° C. and the solution thoroughly stirred during 30–60 minutes. The treated powder is then washed, dehydrated, dried and mixed with 40% of a plasticiser, such as dioctyl phthalate and 10% of a stabilizing agent. The resultant mixture is then heated and converted into film form by conventional means or fabrication processes.

EXAMPLE 4

A mixture of hundred parts of commercial PVC, 40 parts of dioctyl phthalate, 10 parts of a stabilizing agent and 0.1 part of tannic acid is heated, blended and formed into film or sheet form by conventional means and methods, to produce a product suitable for use in accordance with the invention.

In the foregoing example, reference is made to the production of PVC tannic film. The term film, as used for the purpose of this specification and the appended claims, is, however, not intended to be interpreted restrictively, but to comprise equivalent products, such as sheets or plates suitable for use in conjunction with plant protection and cultivation.

While the nature of the tannic PVC obtained by the method described in the foregoing has not as yet been fully ascertained, that is, whether purely physical in the form of absorption or adsorption of the tannic acid by the PVC, or involving a chemical reaction or conversion of the raw PVC into a new product, or involving both a physical and chemical action, the fact of the substantial change of the physical characteristics of the final material (reduced thermal conductivity and infrared transmission), strongly suggests at least a part chemical change or reaction, in view of the new product (tannic PVC) exhibiting the desirable characteristics mentioned for use as an effective and satisfactory agent in plant protection and cultivation.

More particularly, it has been found that tannic PVC possesses a thermal conductivity being about two thirds of the conductivity of ordinary or raw PVC, and about one third of the conductivity of other known synthetic film-forming materials, including polyethylene and cellophane. A similar reduction has been observed of the infrared transmission of tannic PVC compared with ordinary PVC and the remaining materials, respectively.

Besides, the limited infrared transmission of tannic PVC within a range of $6\mu$–$10\mu$ results in the protective sheet or film acting as an absorption filter by substantially reducing or minimizing radiation of the longer wave lengths by the soil during relatively low outside or atmospheric temperatures, thus ensuring an inside temperature being always in excess of the outside temperature.

The novel effects and advantages of tannic PVC for plant protection and cultivation obtained by the invention have been ascertained by numerous comparative germination, cultivation (growth) and other tests carried out by applicant with wheat, turnips, radishes and other agricultural products. In summarizing the results obtained, it was found that germination time has been reduced from one half to one fifth the time compared with normal cultivation methods, that is, using conventional film-forming synthetic materials, or with no protection at all. The same findings apply to the promotion of root and plant growth (vegetation), resulting in reduced cultivation time, compared with conventional methods or materials.

According to Examples 1 and 2, where the tannic acid is applied to the PVC in the final or film form, the amount of tannic acid present in the final product is from 3% to 4% as to the weight of the film. This value applies to PVC having a relatively high degree of polymerization, that is, about 1200. If the degree of polymerization of the basic PVC film is less, it is desirable to increase the amount of tannic acid, to obtain a final product of the same protective properties. In practice, the amount of tannic acid may vary from 3%–10% in substantially inverse proportion to the degree of polymerization varying between 1200 and 600. As a result, the final product (tannic PVC) will remain substantially the same as in the example described.

According to Example 3, where the tannic acid is applied to the PVC in the basic or powder form, the amount is reduced to 1%–3% of the weight of the powder, for degrees of polymerization varying from 1200 to 600, respectively, whereby to again result in about 3% of tannic acid in the final material or tannic PVC film, due to the greater absorption by the PVC powder compared with the adsorption by the film in Examples 1 and 2.

In the foregoing, the invention has been described in reference to a few exemplary processes and products. It will be evident, however, that variations and modifications, as well as the substitution of equivalent steps for those described for illustration, may be made in accordance with the broader scope and spirit of the invention as set forth in the appended claims.

I claim:

1. A method of producing protective PVC film having a reduced thermal conductivity compared with raw PVC and in infrared transmission characteristic encompassing substantially the lower part of the infrared spectrum, for use in plant cultivation, said method comprising the steps of
    (1) dipping a film of raw PVC in a solution containing 3%, based on the weight of said film, of tannic acid, said solution having a bath ratio of 1:40 and a temperature of 80°–90° C.,
    (2) maintaining a dipping time of 30 to 60 minutes at said temperature, and
    (3) cooling the solution and removing said film therefrom.

2. A method of producing protective film as claimed in claim 1, said solution being an aqueous solution.

3. A method of producing protective PVC film having a reduced thermal conductivity compared with raw PVC and an infrared transmission characteristic encompassing substantially the lower part of the infrared spectrum, for use in plant cultivation, said method comprising the steps of
    (1) dipping a film of raw PVC in an aqueous solution of 4%, based on the weight of the film, of tannic acid and 0.5% of phenol, said solution, having a bath ratio of 1:40 and a temperature of 80°–90° C.,
    (2) maintaining a dipping time of 30 to 60 minutes at said temperature, and
    (3) cooling the solution and removing the film therefrom.

4. A method of producing protective PVC film having a reduced thermal conductivity compared with raw PVC and an infrared transmission characteristic encompassing substantially the lower part of the infrared spectrum, for use in plant cultivation, said method comprising the steps of
    (1) intimately mixing raw PVC powder with an aqueous solution of 1%, based on the weight of said powder, of tannic acid, said solution having a bath ratio of 1:5 and a temperature of 80°–90° C.,
    (2) stirring, washing and dehydrating the solution, and
    (3) fabricating the resultant product into a film.

5. A protective film and the like product for use in plant cultivation consisting of tannic PVC composed of raw PVC intimately combined with tannic acid in amounts varying from 0.1%–10% based on the weight of said film in substantially inverse proportion to the degree of polymerization of the PVC used and having a reduced thermal conductivity compared with raw PVC and an infrared transmission characteristic encompassing substantially the lower part of the infrared spectrum.

6. A protective film as claimed in claim 5 having an infrared transmission of from $6\mu$–$10\mu$.

References Cited

UNITED STATES PATENTS

| | | | |
|---|---|---|---|
| 2,448,799 | 9/1948 | Happoldt | 260—75.85 |
| 3,033,814 | 5/1952 | Tholstrup | 260—45.85 |
| 3,277,046 | 10/1966 | Listner | 260—45.85 |

JOSEPH L. SCHOFER, Primary Examiner

J. A. DONAHUE, JR., Assistant Examiner

U.S. Cl. X.R.

260—45.85